(12) United States Patent
Matoy et al.

(10) Patent No.: US 9,067,573 B2
(45) Date of Patent: Jun. 30, 2015

(54) METHOD, SYSTEM AND DEVICE FOR CONTROLLING A VEHICLE BRAKE SYSTEM

(71) Applicant: WABCO Europe BVBA, Brussels (BE)

(72) Inventors: Eric Matoy, Leonard, MI (US); Rainer Jollerichs, Oldenburg (DE); Dirk Wohltmann, Barsinghausen (DE)

(73) Assignee: WABCO Europe BVBA, Brussels (BE)

( * ) Notice: Subject to any disclaimer, the term of this patent is extended or adjusted under 35 U.S.C. 154(b) by 142 days.

(21) Appl. No.: 13/934,698

(22) Filed: Jul. 3, 2013

(65) Prior Publication Data

US 2015/0012196 A1 Jan. 8, 2015

(51) Int. Cl.
*B60T 8/00* (2006.01)
*B60T 7/00* (2006.01)
*B60T 13/00* (2006.01)
*B60T 8/24* (2006.01)
*B60T 8/172* (2006.01)
*B60T 7/22* (2006.01)
*B60T 8/1755* (2006.01)

(52) U.S. Cl.
CPC ............. *B60T 8/246* (2013.01); *B60T 8/172* (2013.01); *B60T 7/22* (2013.01); *B60T 8/1755* (2013.01); *B60T 2201/02* (2013.01); *B60T 2201/16* (2013.01); *B60T 2210/24* (2013.01)

(58) Field of Classification Search
USPC ................................................ 701/70; 303/20
See application file for complete search history.

(56) References Cited

U.S. PATENT DOCUMENTS

| | | | |
|---|---|---|---|
| 4,418,964 A * | 12/1983 | Katagiri et al. | 303/9.74 |
| 5,367,942 A * | 11/1994 | Nell et al. | 303/113.4 |
| 6,564,138 B1 | 5/2003 | Schmitt et al. | |
| 6,866,349 B2 | 3/2005 | Sauter et al. | |
| 7,373,237 B2 | 5/2008 | Wagner et al. | |
| 7,712,845 B2 | 5/2010 | Mackovjack et al. | |
| 2006/0195231 A1 * | 8/2006 | Diebold et al. | 701/1 |
| 2009/0319148 A1 | 12/2009 | Kubo et al. | |

FOREIGN PATENT DOCUMENTS

| | | |
|---|---|---|
| DE | 199 58 772 B4 | 6/2001 |
| DE | 10 238 221 B4 | 10/2003 |
| DE | 10 2007 022 614 A1 | 11/2007 |
| DE | 10 2006 044 777 A1 | 3/2008 |
| DE | 10 2007 061 114 A1 | 6/2009 |
| DE | 10 2009 047 190 A1 | 6/2010 |
| DE | 10 2010 003 951 A1 | 10/2011 |
| DE | 10 2011 107 271 A1 | 1/2013 |
| EP | 1 477 379 A1 | 11/2004 |
| WO | WO 03/031217 A1 | 4/2003 |

\* cited by examiner

*Primary Examiner* — Yonel Beaulieu
(74) *Attorney, Agent, or Firm* — Kramer Levin Naftalis & Frankel LLP

(57) ABSTRACT

To operate an electrically controlled pressurized-fluid brake system, an external brake request signal is received, a curve radius of a vehicle track of the vehicle is determined, at least one limit value is determined based on the curve radius, at least one variable representing a brake pressure to be supplied to wheel brakes is compared with the at least one limit value, the at least one variable is limited based on the comparison, the at least one variable is outputted, and braking pressure is supplied to the wheel brakes based on the outputted at least one variable.

11 Claims, 5 Drawing Sheets

METHOD, SYSTEM AND DEVICE FOR CONTROLLING A VEHICLE BRAKE SYSTEM

FIELD OF THE INVENTION

The present invention generally relates to vehicle brake systems, and more particularly, to a method and control unit for operating an electrically controlled pressurized-fluid brake system for vehicles.

BACKGROUND OF THE INVENTION

DE 102 38 221 B4 discloses a traction control system with braking action, in particular for motor vehicles, wherein a slip-wheel is braked on exceeding a slip pressure threshold by brake engagement. When driving in a curve on a road with a low friction coefficient, the slip threshold of the outer driven wheel is set lower independently of the inner wheel. When driving in a curve with a low friction coefficient, the brake pressure of the outside wheel is slightly increased before the outside wheel exceeds the slip threshold.

DE 10 2007 06 111 4 A1 discloses a device for supporting a two-wheeler driver when cornering, comprising means for monitoring the running state at least in relation to a turn and for pressing the vehicle brake, and a unit for determining a maximum braking force or maximum value for an equivalent variable and for limiting an exerted braking force to the maximum value.

DE 199 58 772 B4 discloses a method for traction slip control of a motor vehicle, comprising several sensors for measuring a transverse acceleration, driving speed of the wheels and a curve radius of the road. These measured values are used for determining a slip value of each wheel, respectively, which are compared with a pre-determined slip threshold. If the determined slip value exceeds the pre-determined slip threshold, the threshold value of the inner driven wheel is changed by using a linear equation.

DE 10 2010 003 951 A1 discloses a method for stabilizing a two-wheeler in driving situations where the two-wheeler is oversteered. A variable representing the oversteered status of the two-wheeler is determined and compared with a pre-determined threshold. If the variable exceeds the pre-determined threshold, a loop control is employed by one or more of exerting a steering torque, varying a brake pressure exerted to the front wheel brake, varying the driving torque exerted to the rear wheel, and varying the brake pressure exerted to the rear wheel.

DE 10 2006 044 777 A1 discloses a process for direction-stabilization of vehicles, in particular motor vehicles, in which the existence of an oversteering driving state generated by the brake intensity is determined. The oversteering status is determined by using wheel speed or steering angle data.

DE 10 2009 047 190 A1 discloses a method for increasing the driving stability and the breaking performance of a motor vehicle in a curve during a braking process. In a brake control operation, the rear axle is controlled by a select-low strategy, in which a lateral acceleration quantity based on a curve specific value or a measured transversal acceleration is determined and the braking pressure is amended. Two strategies are then alternately or additionally used, wherein the second strategy includes the reduction of the brake pressure of the outer front wheel to a value of the brake pressure below the current possible contact of this front wheel.

DE 10 2007 022 614 A1 discloses a method for reducing motor vehicle turning radii, comprising the steps of sensing a turn of a motor vehicle, determining which rear wheel of the motor vehicle is an inner wheel of the turn, and selectively applying a brake of the inner rear wheel in automatic response to the step of sensing to thereby effect a reduction in the turning radius.

Such systems and methods may enhance the stability of a vehicle in the above mentioned situations.

However, external brake requests of driver assistance systems sometimes result in brake demands or requests of a brake force that may be too high in the current situation. Those driver assistance systems include cruise controls (CC) and automatic cruise controls (ACC) or distance regulation systems. Cruise controls regulate the vehicle speed to a pre-determined value. In the case of a downhill driving situation, a brake request may be sent to the brake control unit. Automatic cruise controls are used to keep a distance to a traffic object ahead or in front of the vehicle constant. If the distance to the traffic object is less than a distance threshold value, an external brake request is sent to the brake control unit.

SUMMARY OF THE INVENTION

Generally speaking, it is an object of the present invention to provide a method, a control unit device, and a system for operating an electrically controlled pressurized-fluid brake system for a vehicle with high stabilization in the case of an external brake request.

According to one embodiment of the present invention, the brake control unit is also provided for further functions, such as for distributing a total brake pressure to the wheel brakes based on a load situation. The brake control unit may also be used for stability functions, such as electronic stability program (ESP), ABS, and slip traction control (ASR).

According to an aspect of the present invention, a variable representing the brake pressure of the brake fluid is limited based on a curve radius of the current driving situation of the vehicle. In one embodiment, the variable may, in particular be the brake pressure itself that is exerted to the vehicle brakes. In another embodiment, the variable may be a deceleration demand used in a subsequently performed brake pressure adjusting process. In yet another embodiment, the variable can be a pressure gradient, i.e., the derivation of the brake pressure in time, which represents the dynamic brake pressure behavior.

The terms "curve" and "curve radius" refer to the driving situation of the vehicle, where the curve may be the curve of the road or the lane of the vehicle, or can differ from the lane curve, if the vehicle does not follow its lane. As a rough determination of the curve radius, map data can be used. In a preferred embodiment, the curve may be detected by a detection system, such as a radar system or an optical detection system of the vehicle that is provided for detecting road markers, and/or on the basis of data available in the vehicle, such as driving dynamics data of the vehicle (e.g., yaw rate and vehicle speed).

The terms "external brake request" and "external brake request signal" refer to a request or signal from an external system, i.e., a system different from the braking system itself. This external system preferably detects an environmental situation of the vehicle and is intended to adapt a driving situation of the vehicle to this environmental situation. The external system may, in particular, be an automatic cruise control (ACC) or a distance keeping system for keeping a distance to a traffic object driving in front of the vehicle constant. Further, the external system may be a cruise control function or system for keeping a vehicle speed constant. Such external systems are, in particular, driver assistance systems that provide general assistance to the driver, rather than stability.

Thus, these external systems differ from internal brake systems, such as ABS, ESC, and slip traction control (ASR), which automatically initiate a braking process as part of a vehicle stabilization program.

According to an embodiment of the present invention, the curve of the vehicle track or vehicle lane is determined and used for the evaluation, if the external brake request may result in a deceleration is too high in the current driving situation and therefore, may lead to instability of the vehicle (e.g., due to significant wheel slip).

The dependency of the variable representing the brake pressure on the curve radius may be an arithmetic function. However, a table or map, such as a matrix, map, or table that comprises limit values of the variable for specific curve radius values, can be employed.

One advantage of the present invention is that instabilities due to high brake requests of the external system can be avoided.

The limitation of the brake pressure or the variable representing the brake pressure can, in particular, be performed independently of the µ value or friction coefficient of the road. Many processes and systems of the prior art use a detection of such a friction coefficient in order to adapt the braking force.

In contrast, according to an aspect of the present invention, the limitation of the variable representing the brake pressure can be performed without using estimations of the friction coefficient, since friction coefficients may often change and thus, may not be a good basis for a pressure limitation.

According to yet another aspect of the present invention, limitation of a brake pressure is not so problematic in the case of an external request, contrary to internal demands. The braking action required by an external system is evaluated to be less important, whereas an internal brake requirement of the brake system is used for driving stabilization.

According to a further aspect of the present invention, the method, control unit, and brake system are provided to limit the variable representing the brake pressure before the brake pressure is applied, and can also be provided even in situations when the vehicle is not unstable.

Still other objects and advantages of the present invention will in part be obvious and will in part be apparent from the specification.

The present invention accordingly comprises the features of construction, combination of elements, and arrangement of parts as well as the various steps and the relation of one or more of such steps with respect to each of the others, all as exemplified in the following disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
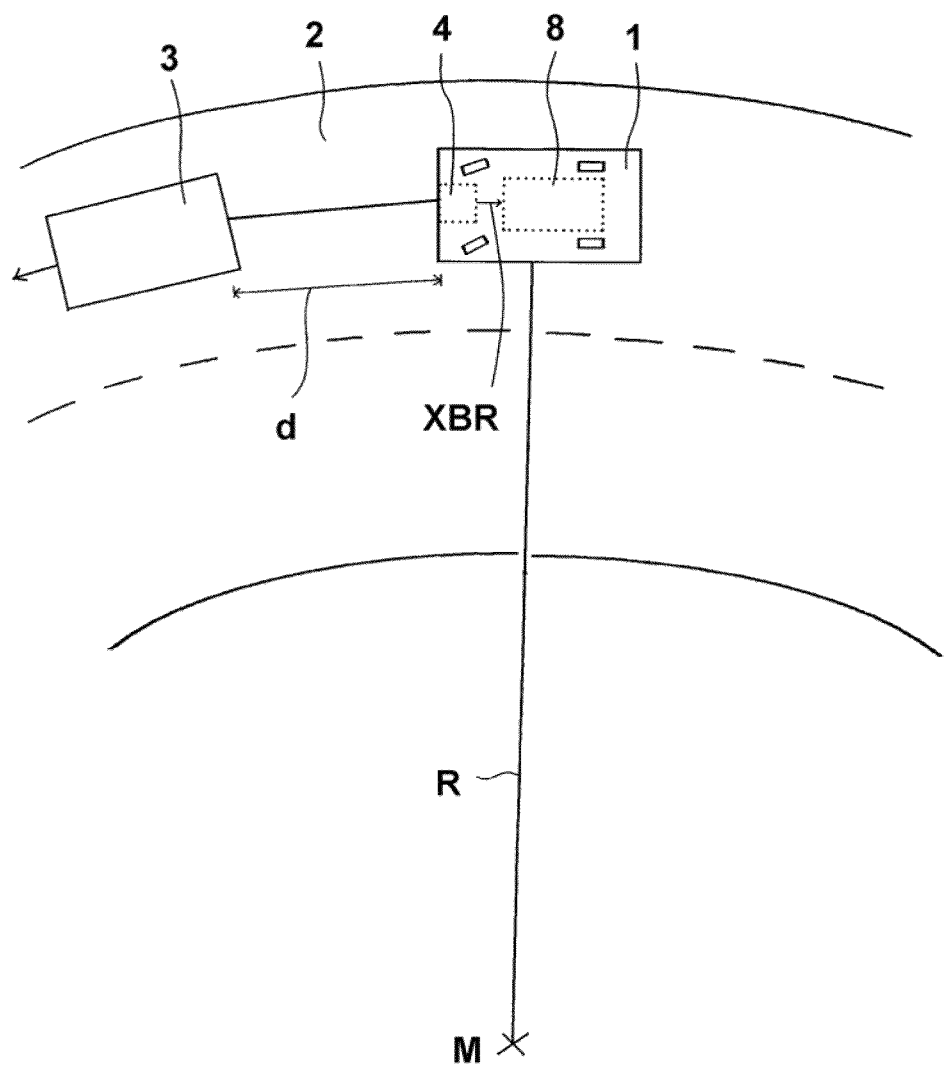
FIG. 1 is a top view of a vehicle in a curve, the vehicle including a brake system according to one embodiment of the invention.
Figure 2:
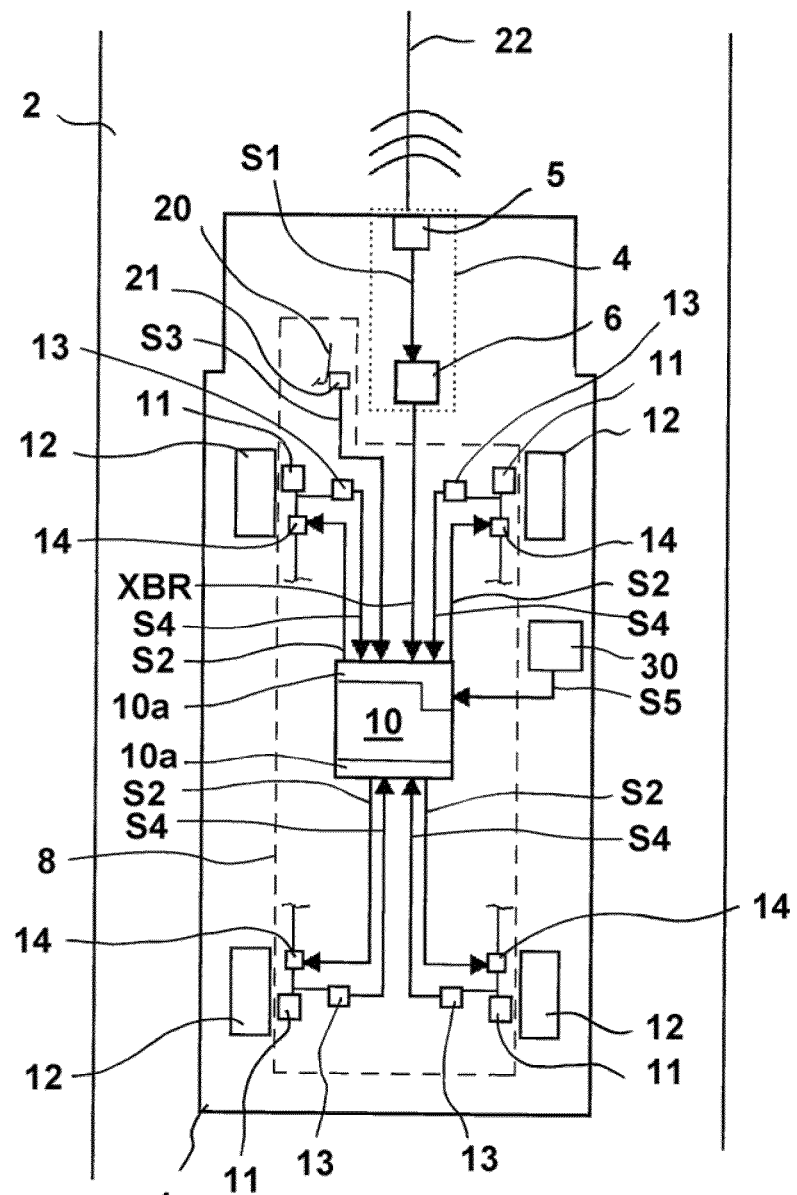
FIG. 2 is a schematic illustration of the vehicle of FIG. 1 according to one embodiment of the invention.

FIG. 1 shows a top view of a vehicle 1 in a curve. FIG. 2 is a schematic illustration of vehicle 1. As shown in FIG. 1, a vehicle 1, in particular a commercial vehicle such as a truck or the like, drives on a lane 2 of a road. The vehicle drives with a speed (velocity) v behind another traffic object, in particular, another vehicle 3. The vehicle 1 is equipped with an automatic cruise control-system 4 comprising a distance sensor 5 for measuring a distance d to the traffic object 3 ahead of the vehicle 1 using radar signals, ultrasound signals, a stereo camera system or the like, and an ACC control unit 6 that receives distance signals 51 from the distance sensor 5 and evaluates whether the current vehicle speed v is too fast on the basis of the measured distance d and the speed of the vehicle.

ACC systems such as this are well known. The ACC control unit 6 can receive the vehicle speed v via a vehicle data bus system, such as a CAN bus or the like. Moreover, the ACC control unit 6 can calculate the speed of the traffic object 3 on the basis of a long term measurement. If the vehicle's speed v is too large, then a brake request signal XBR can be output from the ACC control unit and applied to a brake system 8 of the vehicle 1.

The brake system 8 may comprise several driver stability functions, such as an ABS, an EBS, an ESP (electronic stability program), an ASR (slip traction control), and other assistance functions. The brake system 8 is preferably electro-pneumatic and, as shown in FIG. 2, comprises a brake control unit 10 with a signal interface 10a, a pressurized air supply system (not shown in the figures), and pneumatic wheel brakes 11 on each wheel 12 and ABS valves 14, which receive control signals S2 from the brake control unit. The brake control unit receives an internal brake request S3 from the driver via a brake pedal 20 and a pedal sensor 21. The brake system 8 may also comprise pneumatic and electric devices for the distribution of the brake pressure to the axles of the vehicle and for pressure limitation, as well as valve devices for avoiding damage by increased pressure. Such devices are common and are therefore not shown in the figures.

The brake pressure p supplied to the wheel brakes 11 can be measured by pressure sensors 13, which output a pressure measurement signal S4 to the brake control unit 10. However, it is also possible to calculate the brake pressure from a known supply pressure and the actuation of the ABS valves 14.

In an alternate embodiment, the brake system 8 is pneumatic rather than electro-pneumatic, where analog pressurized air lines or pipes run through the vehicle to the brakes 11, and the brake pressure p is adjusted in a central brake module. In yet other embodiments, hydraulic brake systems or air over hydraulic brake systems are employed. Because all of these embodiments are within the scope of the present invention, it is only relevant that the brake control unit 10 adjusts a brake pressure p in the brakes 11.

The vehicle 1 drives on a track 22, which in general is defined by the lane 2. As shown in FIG. 1, the vehicle 1 drives in a curve with a specific curvature and a curve radius R, which is the distance from the vehicle 1 to the center M of the curve.

The brake control unit 10 either calculates the radius R or receives the calculated value of the radius from another control unit in the vehicle 1 via the internal data bus of the vehicle.

The brake control unit also limits a variable representing the brake pressure p supplied to each pneumatic brake 11, respectively, to a pressure limit p_lim based on the radius R, by outputting control signals S2 to the ABS valves 14.

According to an embodiment of the invention, the variable representing the brake pressure p may be the brake pressure p itself. In this case, the pressure limit p_lim is a function of the curve radius R.

Additionally, or alternatively, the variable representing the brake pressure p may be the derivation in time dp/dt, or a function of dp/dt. In this case, a limit dp_lim is relevant.

According to a further embodiment of the invention, a brake demand or intended deceleration Zs, which is to be used in a subsequent calculation of a distribution of the brake pressure p to the wheel brakes 11, can be used as the variable representing the brake pressure p. In this case, a limitation Zs_lim can be used.

According to yet another embodiment of the invention, the variable representing the pneumatic brake pressure p can also be limited based on the vehicle speed v. However, the brake pressure p can be also limited independently of the vehicle speed v.

The radius R may be calculated on the basis of street map data, which may be supplied via map signals S5 by a navigation system 30 of the vehicle on the basis of stored map data and GPS data. Further, the distance sensor 4 can be used to determine the lane 2 and road markers, and the radius R can then be calculated on the basis of these data. In a preferred embodiment of the invention, dynamic vehicle data are used to determine the curve of the track 22 and thereby the radius R. In particular, obstacles on the road or the lane 2 which are not marked in map data may lead to curves of the track 22 of the vehicle 1. Furthermore, a change of the lane or other drive actions can lead to curve motions. Thus, the curve radius R can be determined by a detected or calculated yaw rate, or by the wheel speed signals of the ABS.

The limitation of the brake pressure p and/or its derivative over time dp/dt may be specified in maps, tables or matrices. According to one embodiment, the initial values can be set in a table such as Table 1 below.

TABLE 1

| Radius (meters) | ≤100 | 150 | 300 | ≥400 |
|---|---|---|---|---|
| p_lim (bar) | 2.0 | 3.0 | 3.0 | 10 |
| dp_lim (bar/s) | 0.75 | 1 | 2 | 100 |

Thus, as an example, a detected or determined radius of 90 meters leads to a p_lim=2.0 bar and a dp_lim=0.75 bar/s. As another example, a radius of 500 meters leads to a p_lim=10 bar and a dp_lim=100 bar/s. Moreover, any radius between the values in Table 1 can be linearly interpolated between the two closest radius points. For example, a radius of 125 meters leads to a p_lim=2.5 bar and a dp_lim=0.875 bar/s (interpolated from the values at 100 meters and 150 meters). As another example, a radius of 225 meters leads to a p_lim=3.0 bar and a dp_lim=1.5 bar/s (interpolated from the values at 150 meters and 300 meters). As yet another example, a radius of 350 meters leads to a p_lim=6.5 bar and a dp_lim=51 bar/s (interpolated from the values at 300 meters and 400 meters). It should be appreciated that the values of p_lim and dp_lim for a radius of curvature equal to or greater than 400 meters can be set sufficiently high such that the pressure and the derivative thereof are essentially not limited and system response is unaffected.

According to another embodiment, however, linear or other functions are possible.

Figure 3:
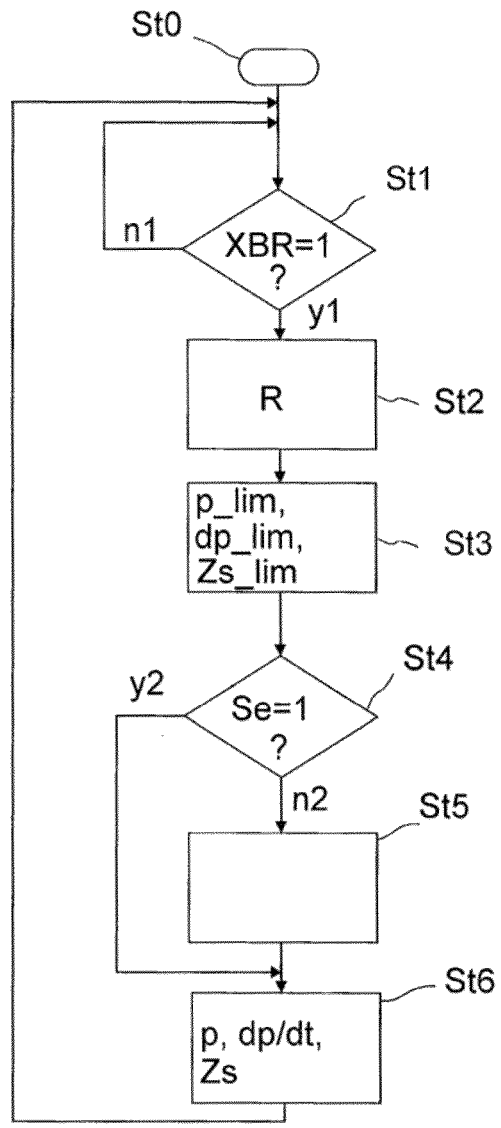
FIG. 3 is a flow chart of a method according to one embodiment of the invention.

The pressure limitation is only provided for an automatic brake that is initiated on the basis of an external brake request signal XBR. In the case of an emergency stop or emergency brake, the pressure limitation may be switched off. If the ACC system 4 detects an emergency situation with a rapidly decreasing distance d to the traffic object 3, which may be due to a crash or sudden brake of the traffic object 3, then the limitations of p and dp/dt may be switched off. However, according to one embodiment, no bypassing of the limitation is provided and steps St4 and St5 are cancelled from the flow chart of FIG. 3. Accordingly, step St6 is subsequent to step St3.

The method according to this embodiment of the present invention thus comprises the following steps.

In step St0, the method of automatically applying a brake pressure to vehicle brakes starts when the ignition is switched on or the motor is started. Step St1 includes checking if an external brake request signal XBR is present. The external brake request signal XBR may, in particular, be sent from the ACC control unit 6.

If XBR=1, i.e., in the case of an external brake request signal, the method proceeds to step St2 via branch y1. If no external brake request is present, the method returns to step St1 via branch n1.

In step St2, the curve radius R is determined. This determination or calculation may be performed in the brake control unit 10 itself, or can be available via a data bus system.

In step St3, one or more limit values p_lim and dp_lim is/are determined based on the curve radius R.

In step St4, the presence of an emergency brake signal Se for a sudden brake request is checked. If, for example, XBR contains such an emergency brake signal, i.e., Se=1, then step St5 is bypassed or bridged and the method proceeds to step St6 via branch y2. If no emergency request is present, then the method proceeds to St5 via branch n2, where one or more of the brake pressure p, its derivative dp/dt, and the deceleration request Zs are limited to its limit value, respectively. In step St6, the brake pressure p, its derivative dp/dt, or the deceleration request is output, i.e., with or without a limitation.

Figure 4A:
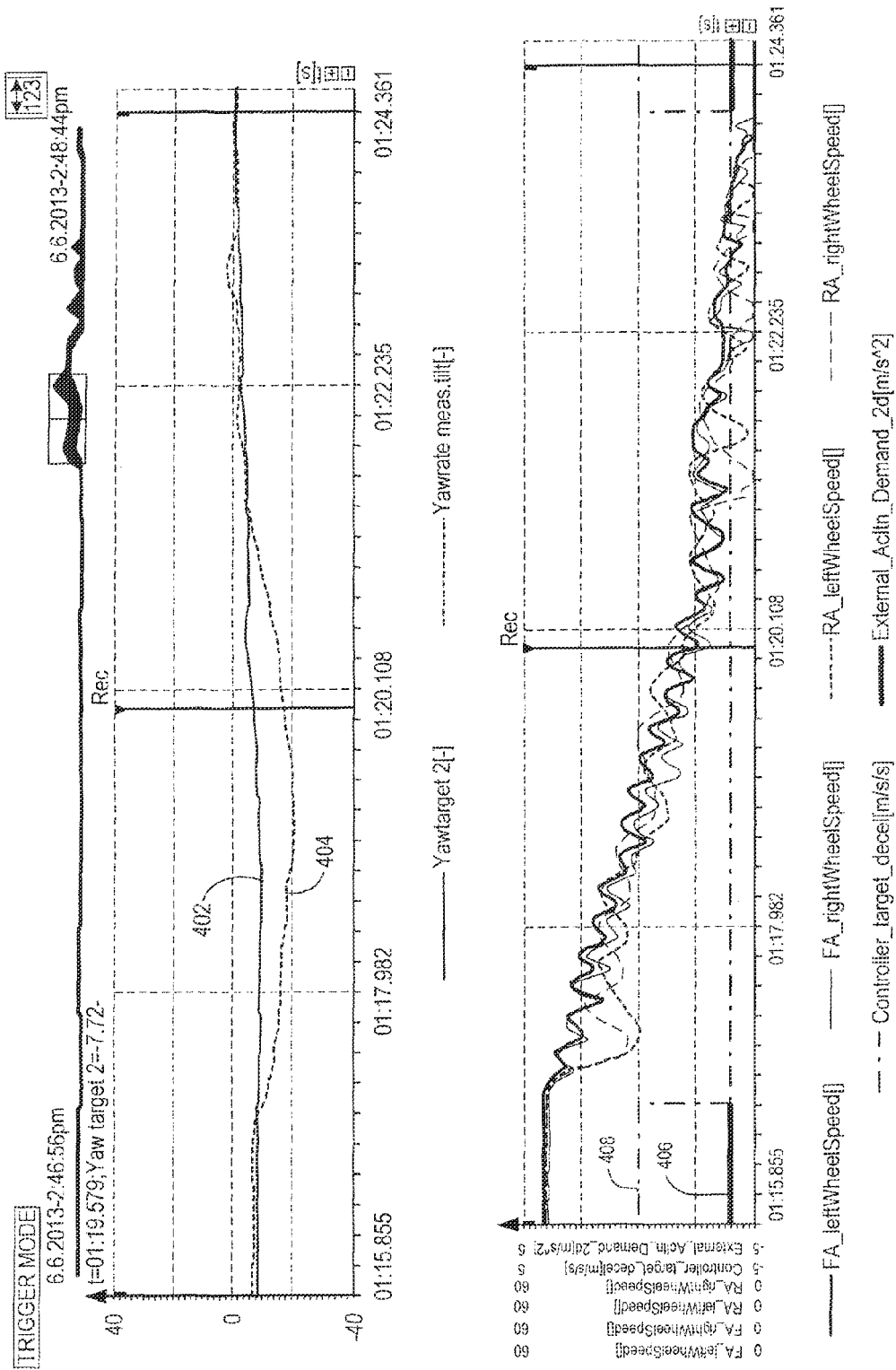
FIG. 4A is a graph depicting an unstable condition of a vehicle when an external brake request is not limited.

When an external brake request is sufficiently limited, vehicle stability can be achieved. As an example, FIG. 4A is a graph depicting an unstable condition of a vehicle when an external brake request is not limited. A curve 402 represents a stable yaw rate for the vehicle, and a curve 404 represents the actual yaw rate of the vehicle. A curve 406 represents a requested deceleration (e.g., −4 m/s$^2$), and a curve 408 represents the deceleration that is actually honored (e.g., by the vehicle's ABS unit). As shown in FIG. 4A, the actual deceleration (curve 408) is not limited, and thus approaches the requested deceleration (curve 406). This causes the actual yaw rate (curve 404) of the vehicle to deviate from the stable yaw rate (curve 402), resulting in an oversteering condition.

Figure 4B:
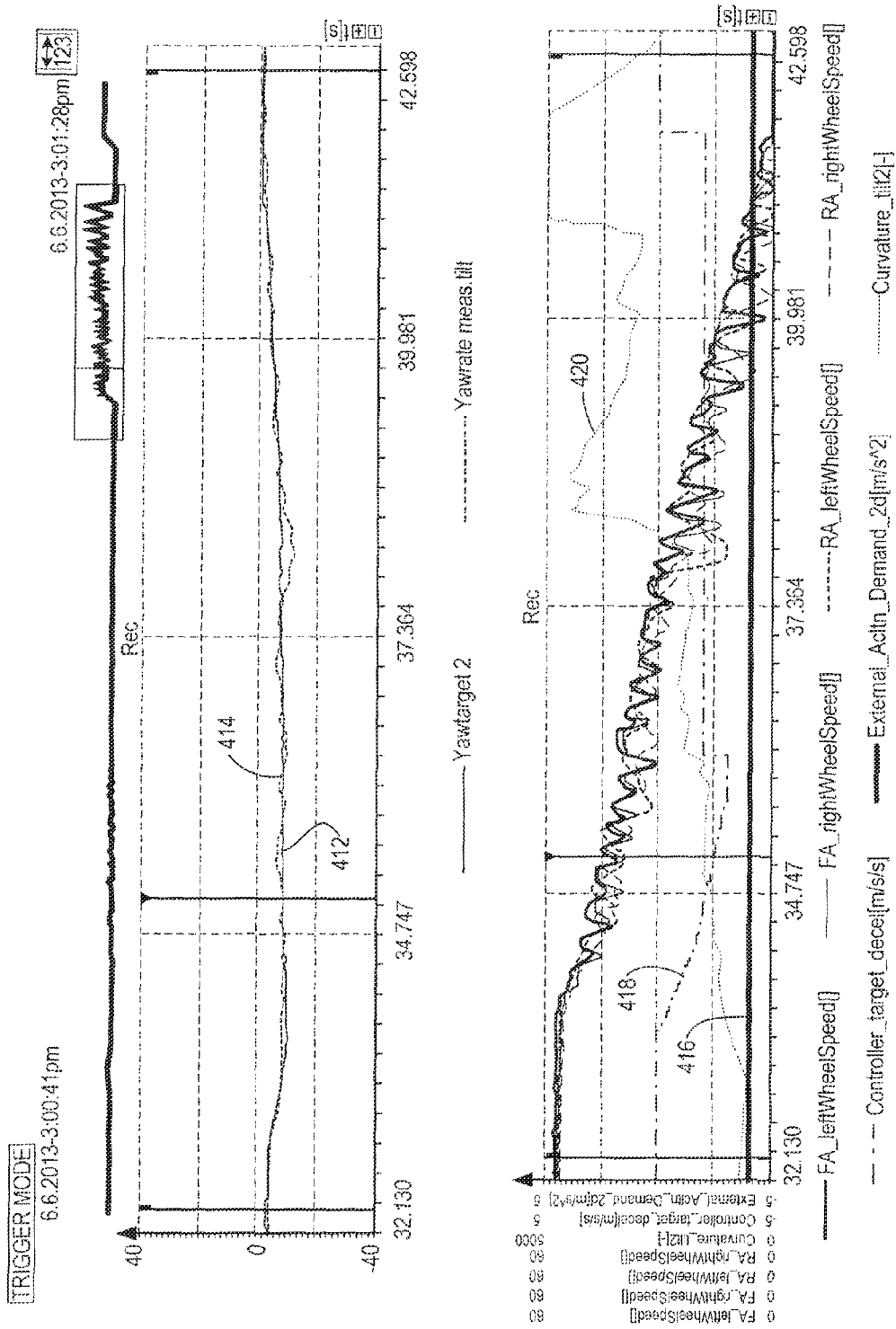
FIG. 4B is a graph depicting a stable condition of the vehicle when the external brake request is limited according to one embodiment of the invention.

In contrast, FIG. 4B is a graph depicting a stable condition of the vehicle when the external brake request is limited based on a radius of curvature of the track of the vehicle. A curve 412 represents a similar stable yaw rate for the vehicle, and a curve 414 represents the actual yaw rate of the vehicle. A curve 416 represents a similar requested deceleration (e.g., −4 m/s$^2$), and a curve 418 represents the deceleration that is actually honored (e.g., by the vehicle's ABS unit). As shown in FIG. 4B, the actual deceleration (curve 418) curves or ramps down towards, but does not reach, the requested deceleration (curve 416). The actual deceleration is limited based on the radius of curvature, of which a curve 420 represents 1/radius of curvature. The radius of curvature can be provided by a radar system or device of the vehicle. As shown in FIG. 4B, the allowed or actual deceleration is limited to a smaller value as the radius becomes smaller. Accordingly, the actual yaw rate (curve 414) of the vehicle remains close to the stable yaw rate (curve 412), and the vehicle remains in a stable condition.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A method for operating an electrically controlled pressurized-fluid brake system of a vehicle on a vehicle track, the vehicle having wheel brakes, the method comprising the steps of:
   receiving, at a brake control unit of the vehicle, an external brake request signal;
   using the brake control unit to:
      one of determine and receive a radius of curvature of the vehicle track of the vehicle;
      determine at least one limit value based on the determined radius of curvature;
      compare at least one variable representing a brake pressure to be supplied to the wheel brakes of the vehicle with the at least one limit value; and
      limit the at least one variable based on the comparison; and
   supplying brake pressure to the wheel brakes based on the limited at least one variable.

2. The method according to claim 1, wherein the at least one variable comprises the brake pressure.

3. The method according to claim 1, wherein the at least one variable comprises a deceleration request for calculating the brake pressure.

4. The method according to claim 1, wherein the at least one variable comprises a brake pressure gradient defined as a derivative of the brake pressure over time.

5. The method according to claim 1, wherein the external brake request signal is input by a driver assistance system.

6. The method according to claim 1, wherein the at least one limit value is determined on the basis of one of a data table and a data map, the one of the data table and the data map comprising limit values for specific values of the at least one variable.

7. The method according to claim 1, wherein limiting the at least one variable based on the comparison is performed only when no emergency brake signal for an emergency brake is present.

8. The method according to claim 1, wherein limiting the at least one variable based on the comparison is effected prior to supplying the brake pressure to the wheel brakes.

9. A brake control unit for a vehicle brake system, the brake control unit comprising a signal interface configured to receive external brake request signals, and to output control signals to fluid valves of the vehicle brake system for wheel brakes of a vehicle, the brake control unit being configured to:
   one of determine and receive a radius of curvature of a vehicle track of the vehicle;
   determine at least one limit value based on the determined radius of curvature;
   compare at least one variable representing a brake pressure to be supplied to the wheel brakes of the vehicle with the at least one limit value; and
   limit the at least one variable based on the comparison, the at least one variable being included in at least one control signal for output to the fluid valves.

10. A vehicle brake system, comprising:
   the brake control unit according to claim 9;
   wheel brakes allocated to vehicle wheels; and
   at least one valve for supplying the wheel brakes with a brake pressure, wherein the at least one valve is configured to receive control signals from the brake control unit that are calculated by the brake control unit.

11. A vehicle brake system according to claim 10, wherein the at least one valve comprises an electro-pneumatic valve.

* * * * *